US00RE40560E

(19) United States
(12) Reissued Patent
Capella

(10) Patent Number: US RE40,560 E
(45) Date of Reissued Patent: Nov. 4, 2008

(54) SWITCH PLATE FRAME

(75) Inventor: Joaquin Aubert Capella, Barcelona (ES)

(73) Assignee: Simon, S.A., Barcelona (ES)

(21) Appl. No.: 29/210,610
(22) Filed: Aug. 3, 2004

Related U.S. Patent Documents

Reissue of:
(64) Patent No.: Des. 461,113
Issued: Aug. 6, 2002
Appl. No.: 29/152,464
Filed: Dec. 19, 2001

U.S. Applications:
(62) Division of application No. 29/139,867, filed on Apr. 6, 2001, now Pat. No. Des. 461,393.

(30) Foreign Application Priority Data

Oct. 6, 2000 (ES) ..... 149 529

(51) LOC (8) Cl. ..... 11-05
(52) U.S. Cl. ..... D8/353; D6/300; D6/301
(58) Field of Classification Search ..... D8/350–353; D13/177; D6/300, 301, 303, 309; 220/241; 174/66; 16/402
See application file for complete search history.

(56) References Cited

U.S. PATENT DOCUMENTS 3,689,868 A * 9/1972 Snyder ..... 439/501

(Continued)

*Primary Examiner*—Robert M. Spear
*Assistant Examiner*—Mark A Goodwin
(74) *Attorney, Agent, or Firm*—Michael J. Striker

(57) CLAIM

The ornamental design for a switch plate *frame*, as shown and described.

DESCRIPTION

FIG. 3 is a top plan view thereof;

FIG. 4 is a right side view thereof [which is a mirror image of the left side] *and left side view being a mirror image* thereof;

FIG. 5 is a rear view thereof;

FIG. 6 is a bottom plan view thereof;

1 Claim, 11 Drawing Sheets

Figure 1:
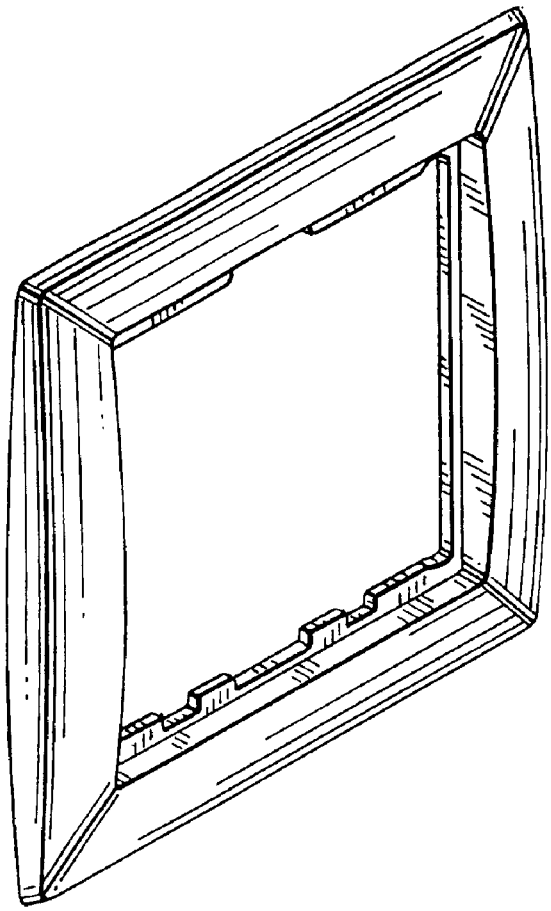
FIG. 1 is a top front and left side perspective view of [an outer frame for a single] *a* switch plate *frame showing my new design*.
Figure 2:
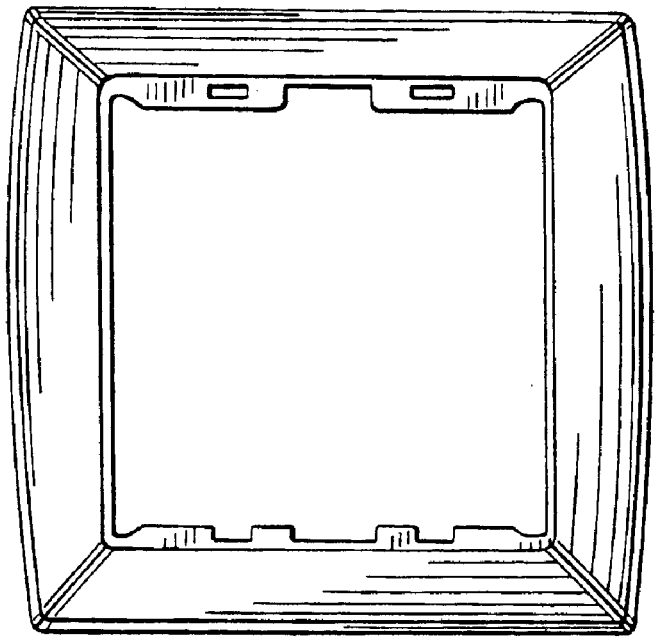
FIG. 2 is a front view thereof.
Figure 7:
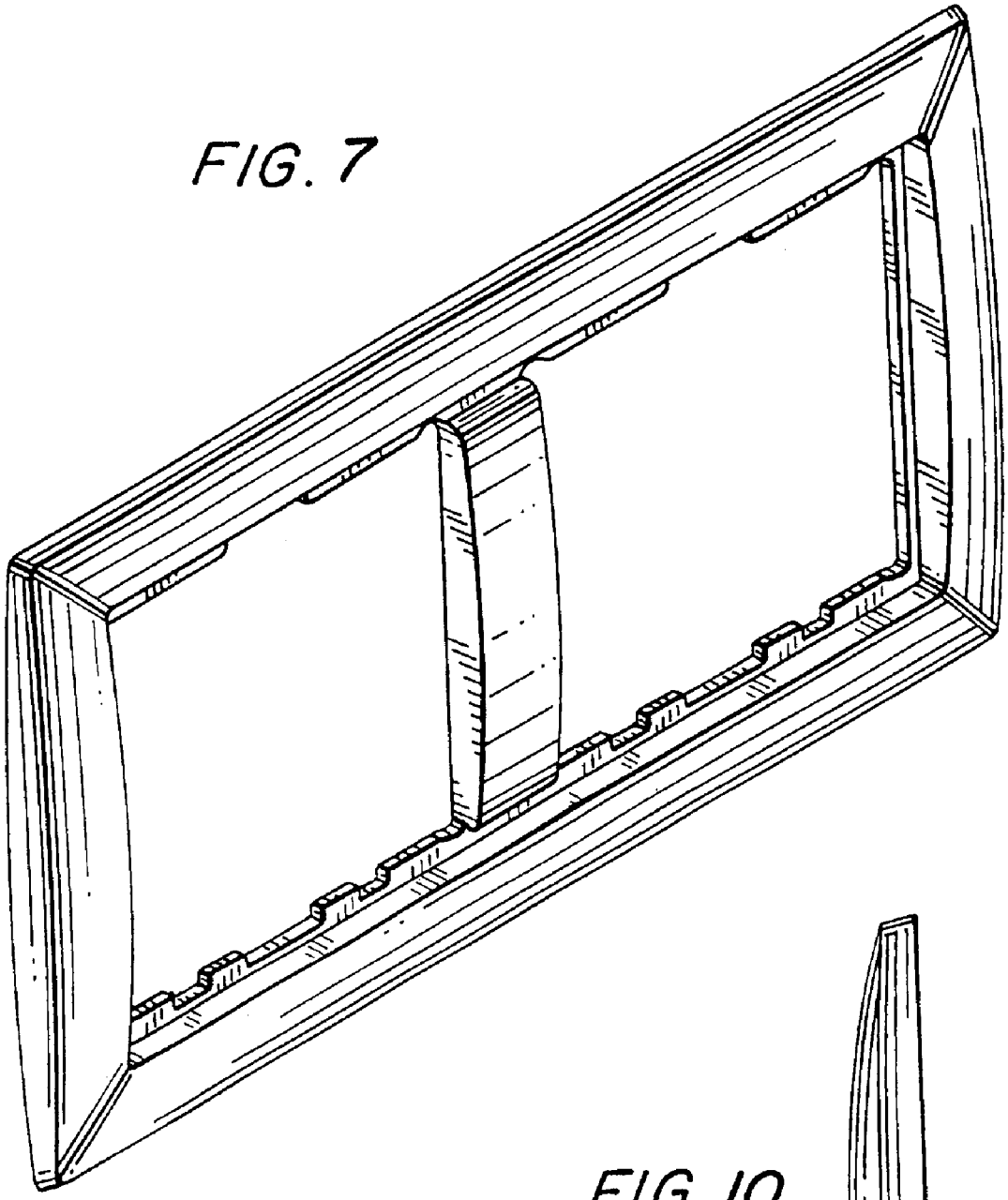
FIG. 7 is a top front and left side perspective view of [an outer frame for a double switch plate] *a second embodiment of a switch plate frame showing my new design*.
Figure 10:
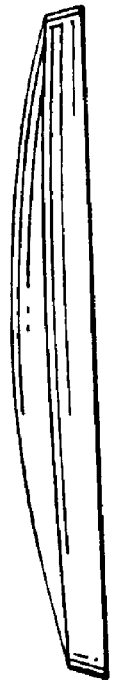
FIG. 10 is a right side view thereof [which is a mirror image of the left side] *the left side view being a mirror image* thereof.
Figure 8:
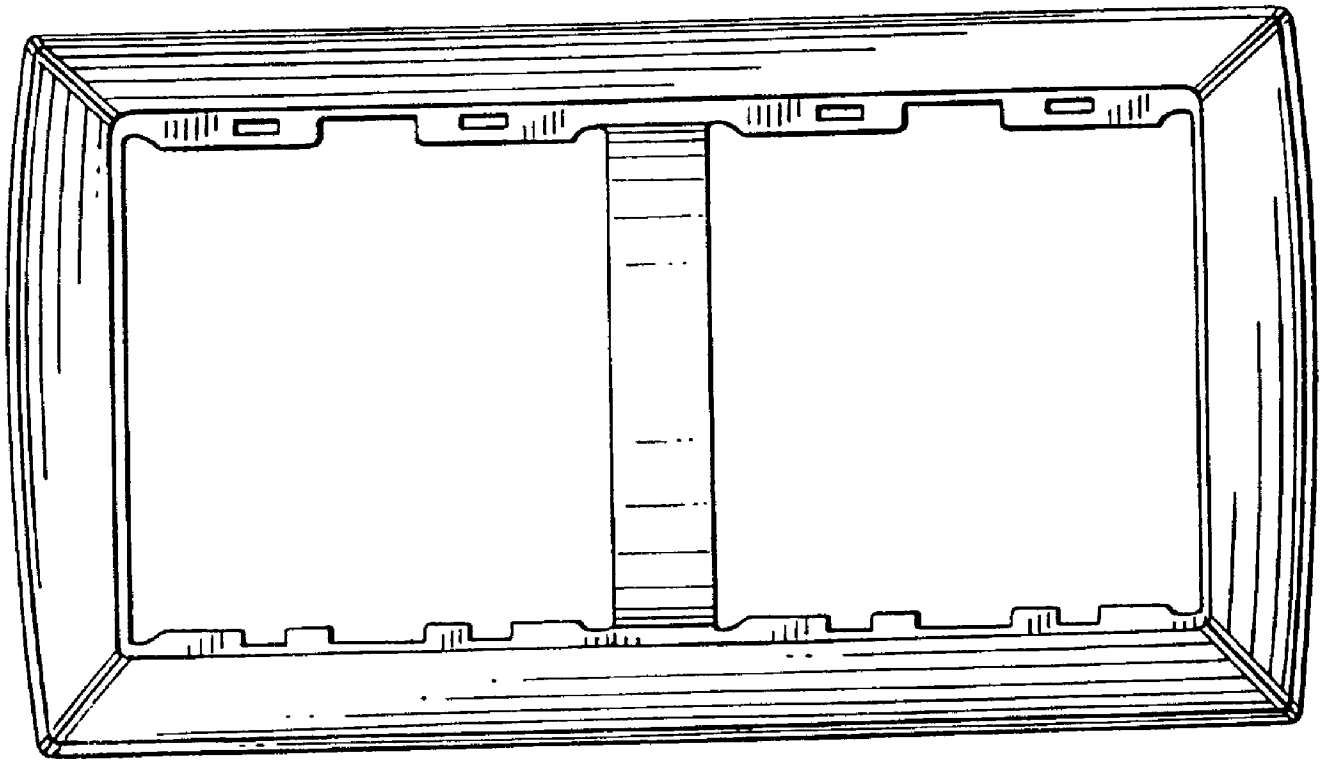
FIG. 8 is a front view thereof.
Figure 9:
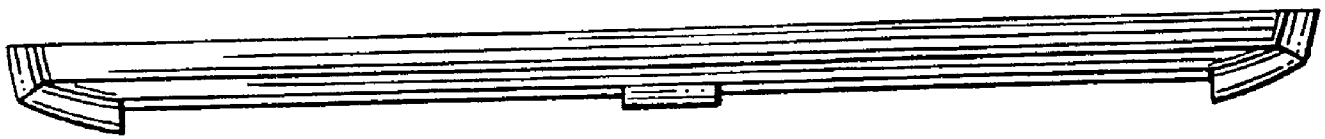
FIG. 9 is a top plan view thereof.
Figure 11:
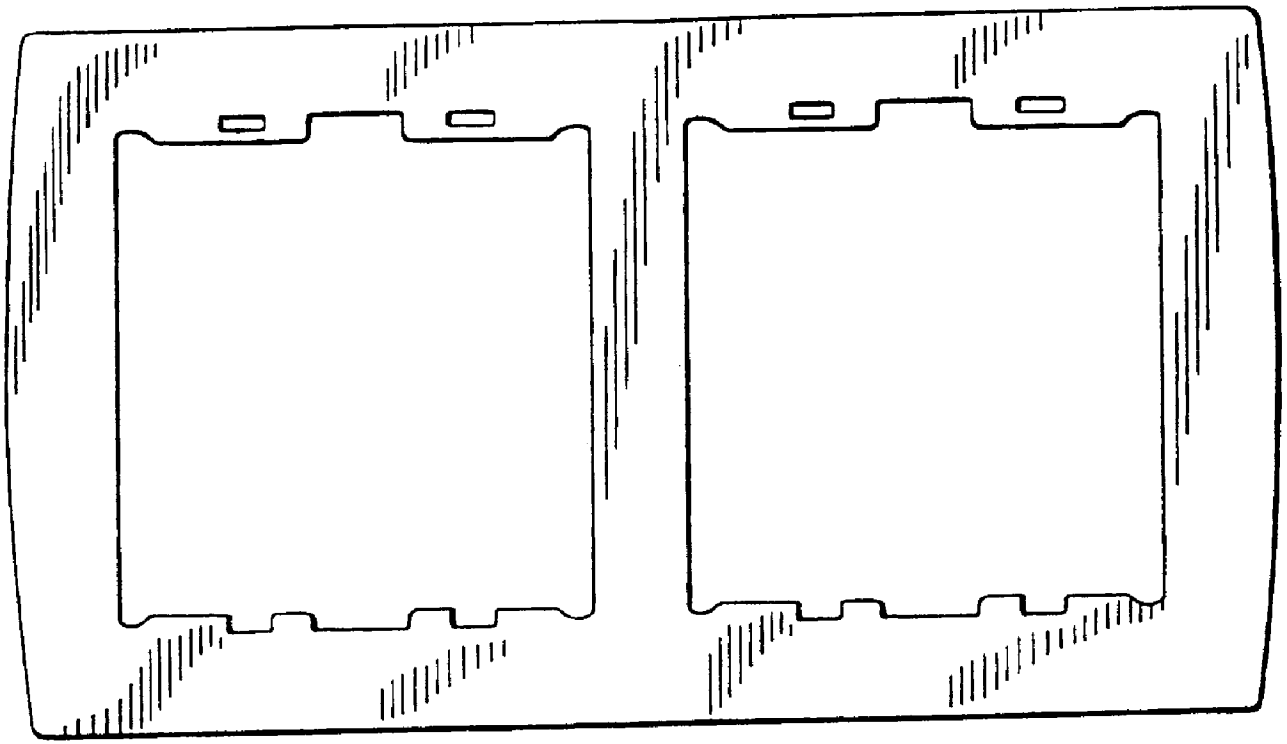
FIG. 11 is a rear view thereof.
Figure 12:
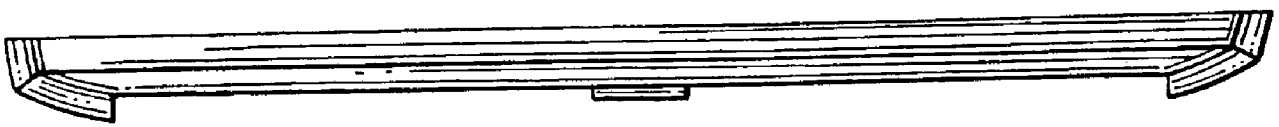
FIG. 12 is a bottom plan view thereof.
Figure 16:
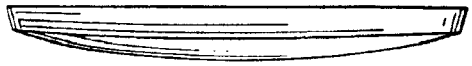
FIG. 16 is a right side view thereof [which is a mirror image of the left side] *the left side view being a mirror image* thereof.
Figure 13:
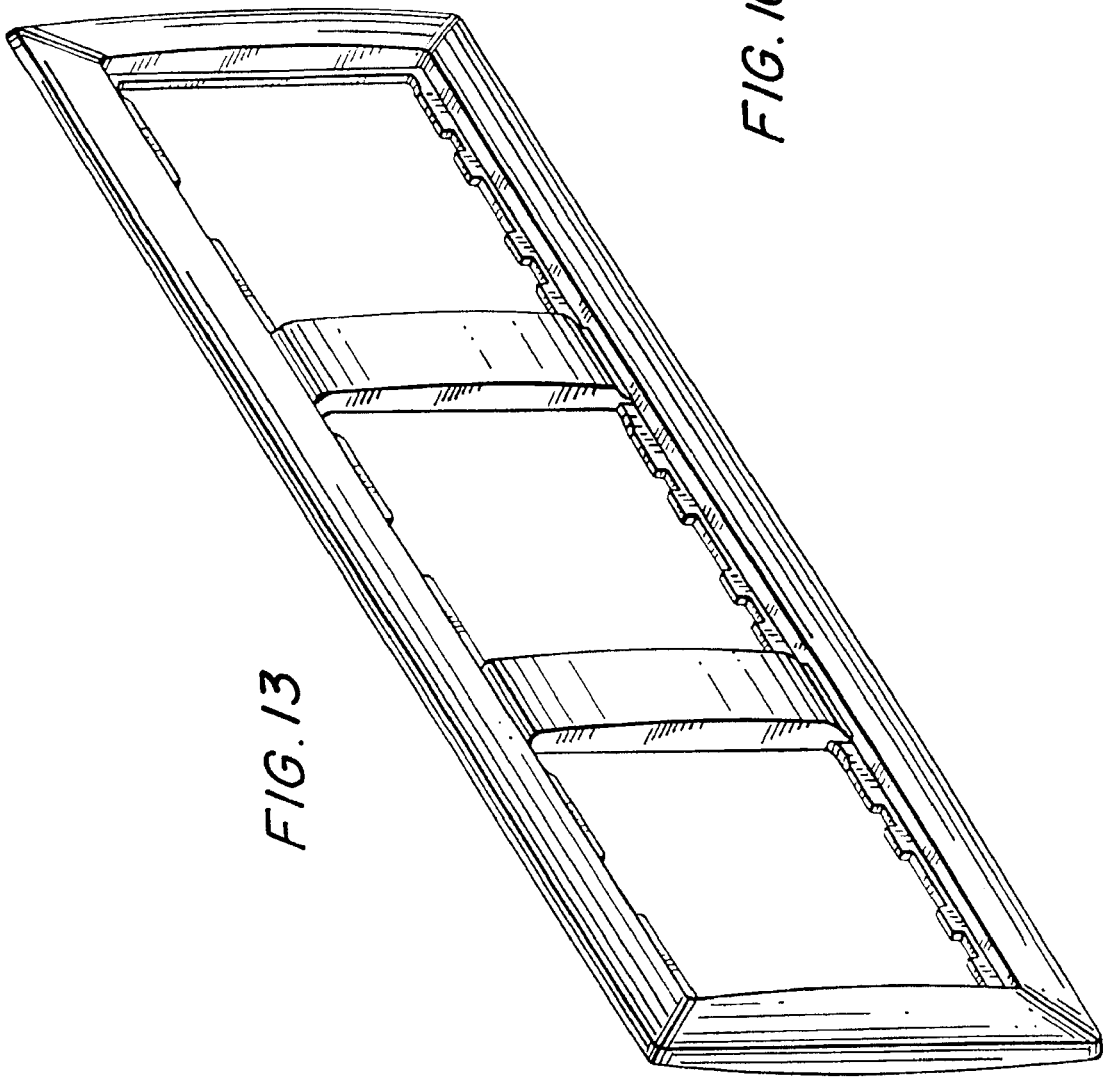
FIG. 13 is a top front and left side perspective view of [an outer frame for a triple switch plate] *a third embodiment of a switch plate frame showing my new design*.
Figure 14:
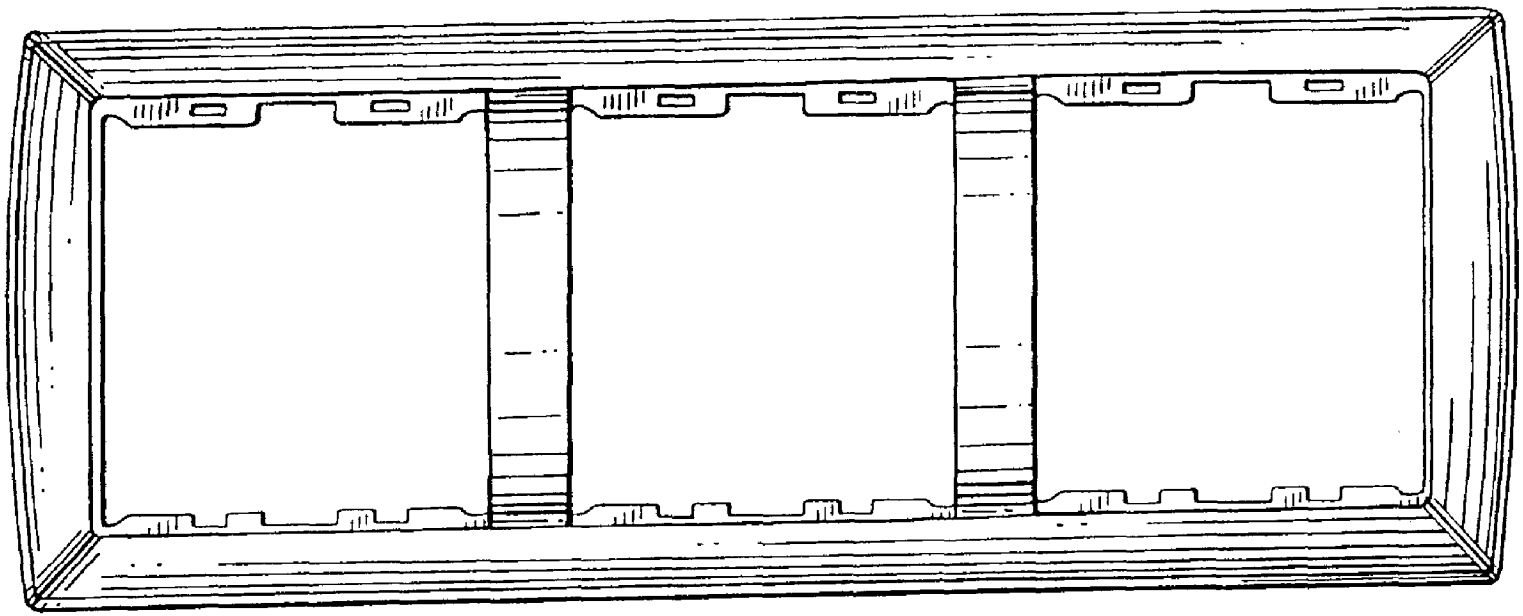
FIG. 14 is a front view thereof.
Figure 15:
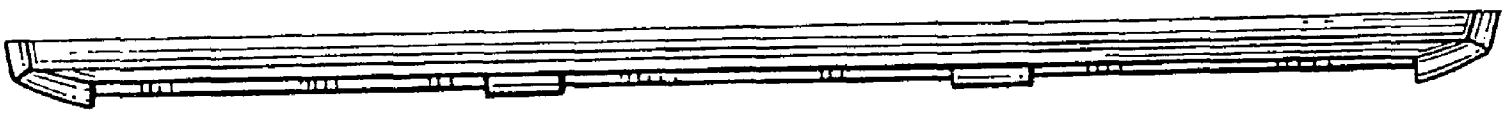
FIG. 15 is a top plan view thereof.
Figure 17:
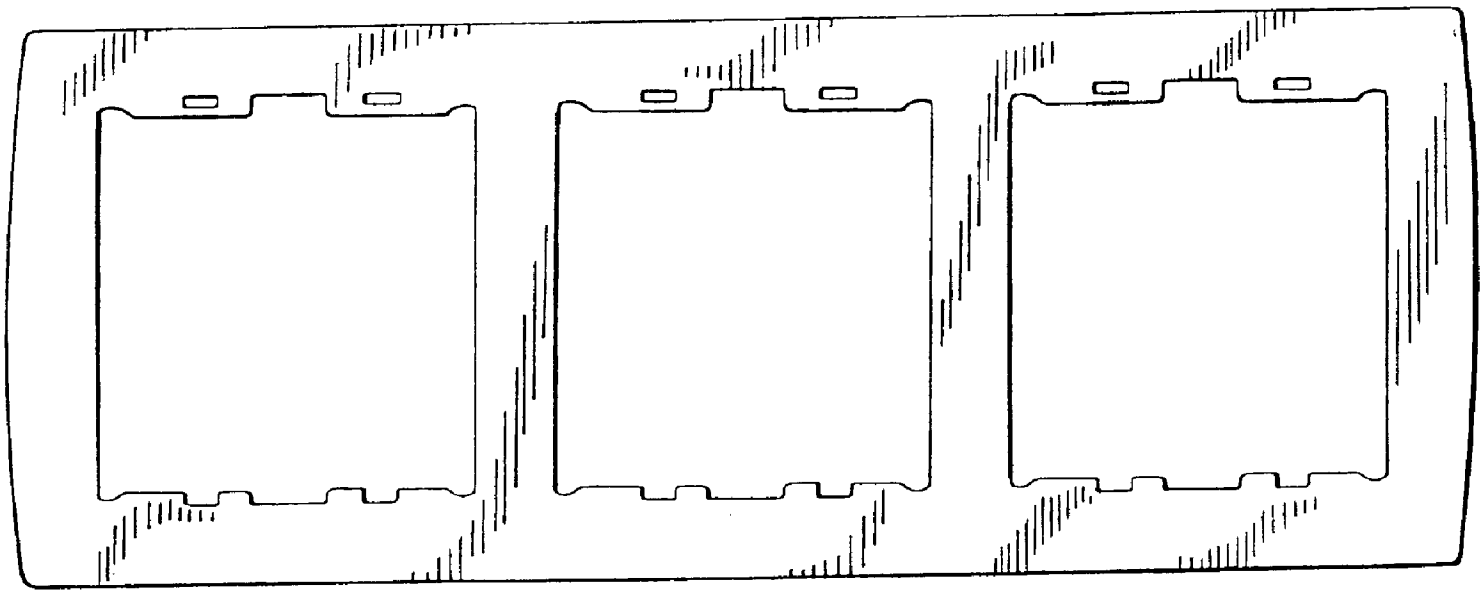
FIG. 17 is a rear view thereof.
Figure 18:
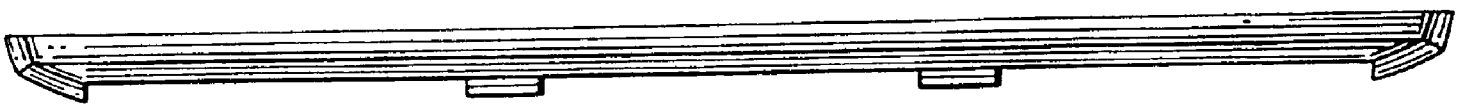
FIG. 18 is a bottom plan view thereof.
Figures 19, 22:
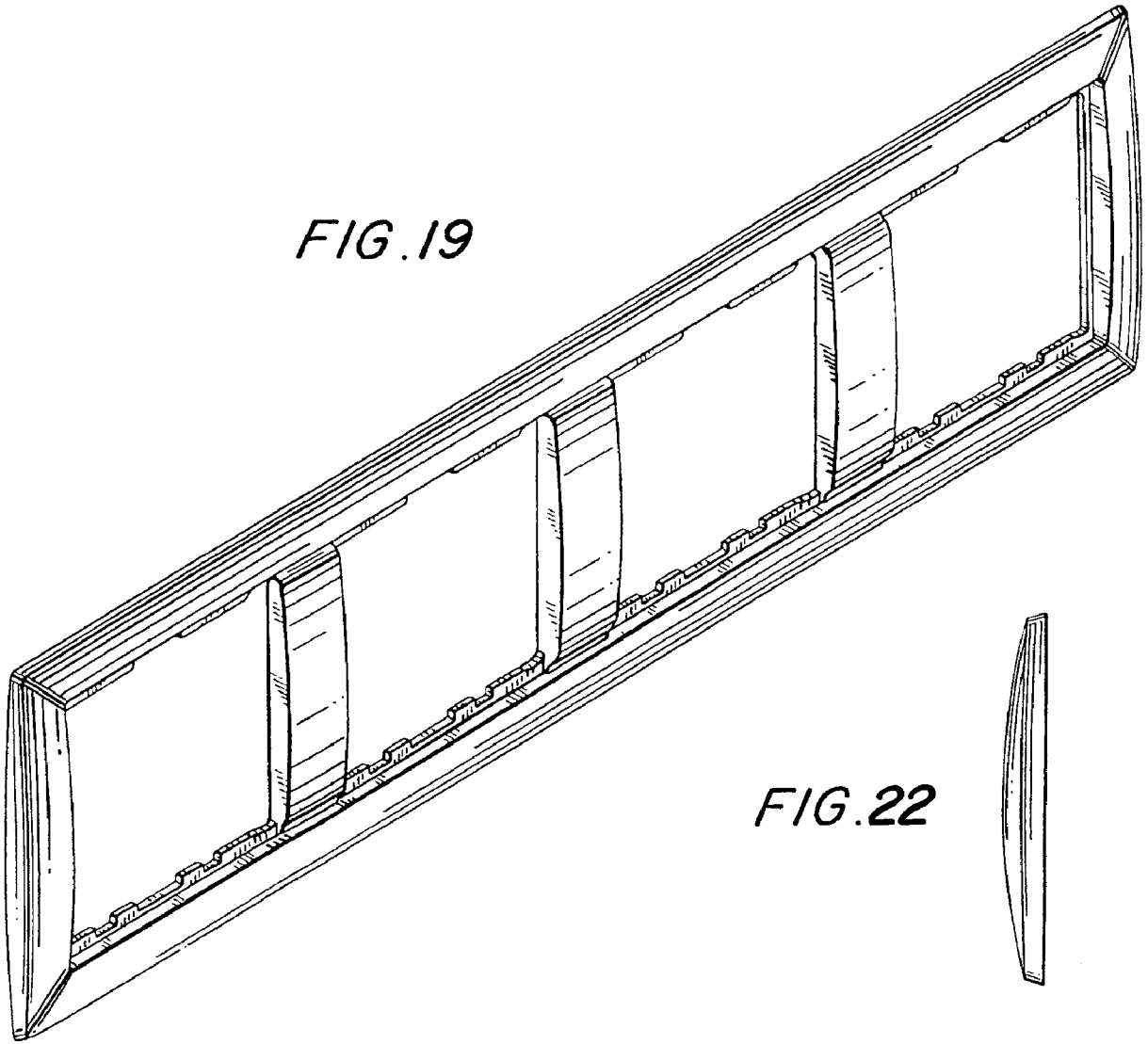
FIG. 19 is a top front and left side perspective view of [an outer frame for a quadruple switch plate] *a fourth embodiment of a switch plate frame showing my new design*.
FIG. 22 is a right side view thereof [which is a mirror image of the left side] *the left side view being a mirror image* thereof.
Figure 20:
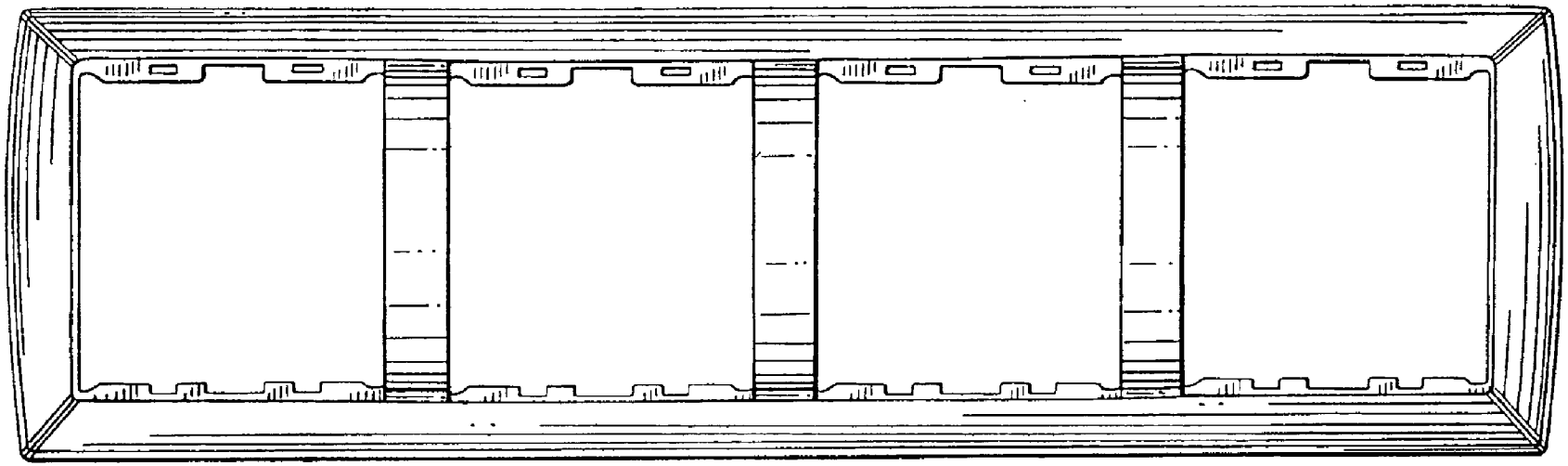
FIG. 20 is a front view thereof.
Figure 21:
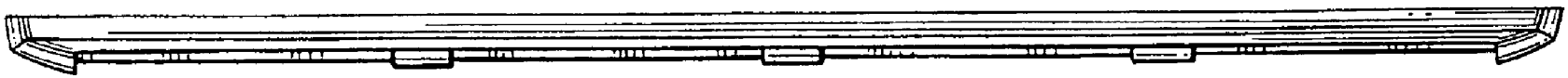
FIG. 21 is a top plan view thereof.
Figure 23:
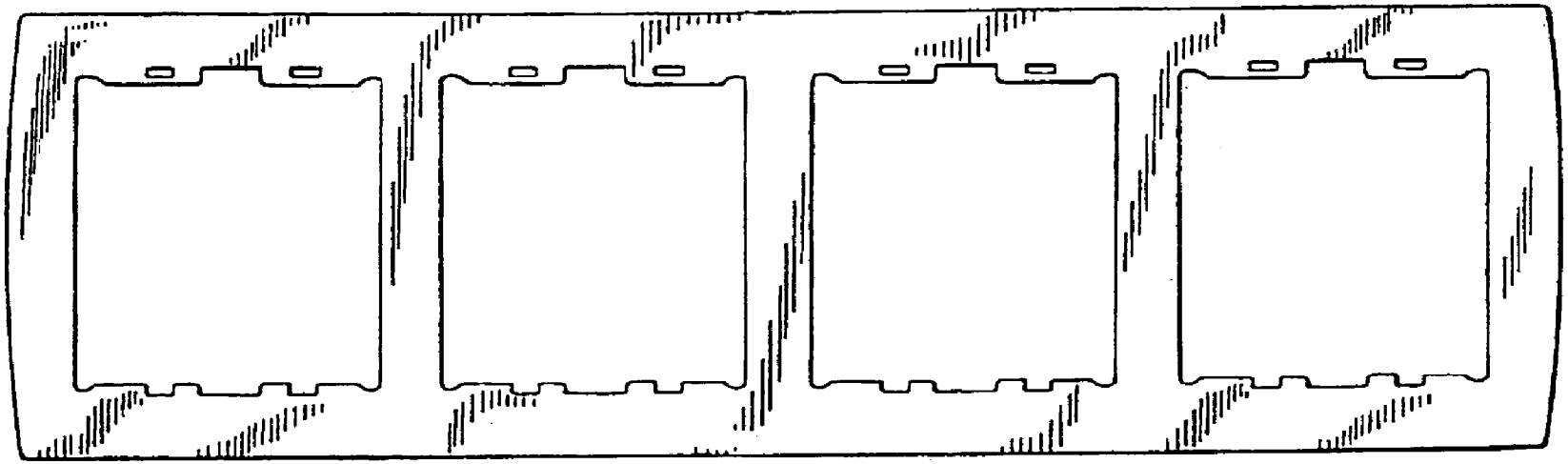
FIG. 23 is a rear view thereof.
Figure 24:
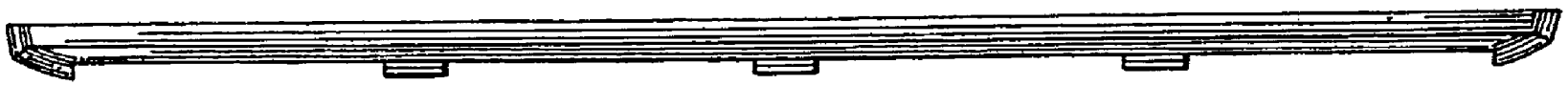
FIG. 24 is a bottom plan view thereof.

Matter enclosed in heavy brackets [ ] appears in the original patent, but forms no part of this reissue; matter printed in italics indicates the additions made by reissue.

U.S. PATENT DOCUMENTS 5,073,681 A * 12/1991 Hubben et al. ..... 174/66
D340,718 S * 10/1993 Leger et al. ..... D14/224
D379,453 S * 5/1997 Fabrizi ..... D13/177
D430,478 S * 9/2000 De brey et al. ..... D8/353
6,281,440 B1 * 8/2001 Baldwin et al. ..... 174/66

* cited by examiner

FIG. 3
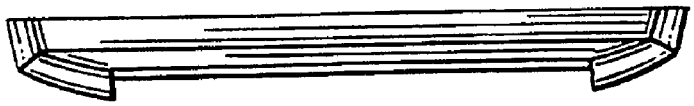
FIG. 4
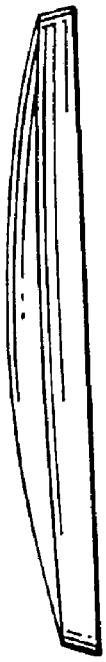
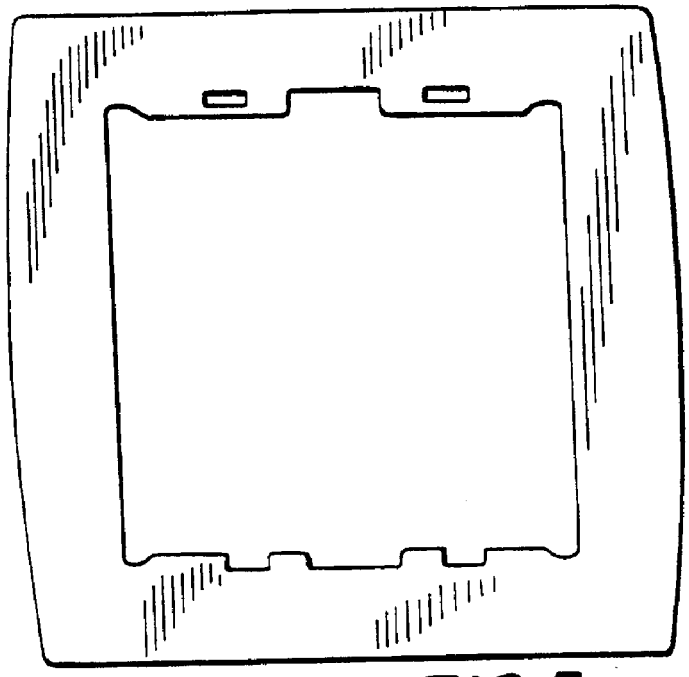
FIG. 5
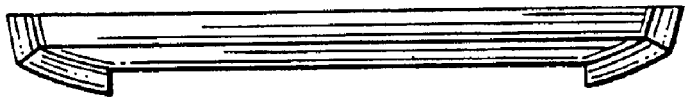
FIG. 6